(12) United States Patent
Dickinson

(10) Patent No.: US 7,621,593 B2
(45) Date of Patent: Nov. 24, 2009

(54) MEAL TRAY WITH ADVERTISING DISPLAY

(75) Inventor: Martin Ian Dickinson, Northampton (GB)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/685,292

(22) Filed: Mar. 13, 2007

(65) Prior Publication Data

US 2007/0216202 A1    Sep. 20, 2007

Related U.S. Application Data

(60) Provisional application No. 60/767,259, filed on Mar. 14, 2006.

(51) Int. Cl.
*A47B 83/02* (2006.01)
*A47C 7/62* (2006.01)
*G09F 3/00* (2006.01)

(52) U.S. Cl. .................. 297/163; 297/146; 297/173; 297/188.05; 40/320

(58) Field of Classification Search .................. 297/146, 297/173, 188.06, 188.05, 188.21, DIG. 6, 297/163; 40/320, 661
See application file for complete search history.

(56) References Cited

U.S. PATENT DOCUMENTS

| 741,004 | A | * | 10/1903 | Van Nostran | ................. 40/320 |
| 769,868 | A | * | 9/1904 | May | ........................ 40/606.15 |
| 2,384,274 | A | * | 9/1945 | Bean | ........................ 40/661.04 |
| 4,521,021 | A | | 6/1985 | Dixon | |
| 4,643,381 | A | | 2/1987 | Levy | |
| 5,010,668 | A | | 4/1991 | Zeligson | |
| 5,259,136 | A | * | 11/1993 | Goserud | .................. 40/654.01 |
| 5,413,035 | A | | 5/1995 | Fernandez | |
| 5,720,515 | A | * | 2/1998 | Haffner | ................. 297/188.04 |
| 5,738,217 | A | | 4/1998 | Hunter | |
| 5,749,305 | A | | 5/1998 | Jacovelli | |
| 5,927,502 | A | | 7/1999 | Hunter | |
| 6,068,127 | A | | 5/2000 | Hunter | |
| 6,240,667 | B1 | * | 6/2001 | Harney et al. | .................. 40/649 |
| 6,401,927 | B1 | | 6/2002 | Sorensen et al. | |
| 6,425,649 | B2 | | 7/2002 | Kasuya | |
| 6,592,179 | B1 | | 7/2003 | Miyazaki | |
| 6,758,518 | B2 | * | 7/2004 | Ingram et al. | ................ 297/146 |
| 6,869,120 | B2 | | 3/2005 | Johnson, Jr. et al. | |
| 7,104,599 | B2 | | 9/2006 | Berger et al. | |
| 2003/0217673 | A1 | | 11/2003 | Berger et al. | |

FOREIGN PATENT DOCUMENTS

| DE | 4340189 A1 | 6/1995 |
| DE | 29907135 U1 | 9/1999 |
| DE | 20108619 U1 | 1/2002 |
| DE | 2013534 U1 | 5/2002 |
| DE | 20207355 U1 | 10/2002 |
| EP | 1260433 A2 | 11/2002 |
| WO | 2006119784 A1 | 11/2006 |

* cited by examiner

*Primary Examiner*—Milton Nelson, Jr.
(74) *Attorney, Agent, or Firm*—Adams Intellectual Property Law

(57) ABSTRACT

A meal tray for a passenger seat includes a removable insert. The insert carries a sheet of graphics or advertisements in a protected, viewable position when the meal tray is stowed. Tamper-resistant latches secure the insert to the meal tray.

12 Claims, 13 Drawing Sheets

MEAL TRAY WITH ADVERTISING DISPLAY

BACKGROUND OF THE INVENTION

This invention relates generally to vehicle passenger seating and more particularly to a meal tray for a passenger seat unit.

Commercial passenger aircraft seats often include seat-back-mounted meal trays for use in consuming meals, holding work items, and the like. These trays typically fold between an upright, stowed position against the seat back of a seat forward of the user, and a lowered, deployed use position. It is known to adapt passenger seat meal trays to carry graphic displays with passenger information or advertisements.

These displays are subject to theft or vandalism and must be protected. However, the time available for changing the displays between flights is short, and therefore it is undesirable to employ a mounting structure which is too complex. There is therefore a need for a display mounting device and system and is adapted particularly to the public transportation environment, for example, aviation, rail and bus transportation.

Accordingly, there is an object of the invention to provide for a meal tray with a secure yet easily-changed structure for displaying advertising or similar graphical materials.

This and other objects and advantages of the invention are achieved by providing a meal tray assembly for being carried by an aft-facing side of a seat back for use by a person seated aft of the seat back, and comprising a tray mountable to the seat back so that it is movable between a stowed position generally flush with the seat back and a deployed position generally perpendicular to the seat back. The tray includes a first surface facing forward when in the stowed position and a second surface facing rearward towards the aft-seated person when in the stowed position. The second surface includes a recess, and a transparent cover is provided for being positioned in or over the recess and defining a space between the second surface and the transparent cover for receiving and holding a graphical display sheet for viewing by the person seated aft of the seat back when the tray is in the stowed position.

According to one embodiment of the invention, the cover is generally flush with the second surface surrounding the recess when positioned in the recess. According to another embodiment of the invention, the recess communicates with a side edge of the tray, and the cover is sized to slide into the recess from the side edge of the tray.

According to another embodiment of the invention, the cover includes first and second panels positioned in a frame and spaced-apart for receiving the graphical display sheet there between.

According to another embodiment of the invention, the cover includes a first transparent panel and a second panel positioned in a frame and spaced-apart for receiving the graphical display sheet there between.

According to another embodiment of the invention, the recess includes a pair of opposed locking receptacles adapted to receive and retain a pair of complementary latches on the frame for locking the frame into the recess.

According to another embodiment of the invention, the second panel includes an elongate slot having a width suitable for permitting a finger to extend into the slot for removing the graphical display sheet from between the first and second panels.

According to another embodiment of the invention, the recess includes at least one fastener element positioned therein, and the transparent cover includes at least one complementary fastener element for engaging the at least one fastener element and retaining the cover in the recess.

According to another embodiment of the invention, the recess includes a plurality of spaced-part fastener elements positioned in the recess around the periphery thereof, and the transparent cover includes a plurality of spaced-apart complementary fastener elements for engaging the plurality of spaced-apart fastener elements for retaining the cover in the recess.

According to another embodiment of the invention, the transparent cover includes a frame, and the complementary fastener elements are positioned on the frame.

According to another embodiment of the invention, the plurality of fastener elements and the plurality of complementary fastener elements comprise complementary hook and loop fastener elements.

According to another embodiment of the invention, the at least one fastener element and the at least one complementary fastener element are detachable from each other by pulling the cover away from engagement with the recess.

According to another embodiment of the invention, a suction cup is provided for pulling the cover away from engagement with the recess.

According to another embodiment of the invention, the recess includes a pair of opposed tab slots and the cover includes a pair of complementary tabs for being received within the tab slots. The cover is flexible and, including the tab slots, is greater in dimension than a corresponding dimension of the recess whereby the cover must be flexed into a curved shape for the tabs to be received into the tab slots, and must be flexed into a curved shape for the tabs to be removed from the tab slots.

According to another embodiment of the invention, a meal tray assembly is provided for being carried by an aft-facing side of a seat back for use by a person seated aft of the seat back, and comprises a tray mountable to the seat back so that it is movable between a stowed position generally flush with the seat back and a deployed position generally perpendicular to the seat back. The tray includes a first surface facing forward when in the stowed position and a second surface facing rearward when in the stowed position. The second surface includes a recess having a plurality of spaced-part touch fastener elements positioned in the recess around the periphery thereof. A transparent cover is provided for being positioned in the recess and defining a space between the second surface and the transparent cover for receiving and holding a graphical display sheet for viewing by the person seated aft of the seat back when the tray is in the stowed position. The transparent cover includes a frame having a plurality of spaced-apart complementary touch fastener elements thereon for engaging the plurality of spaced-apart fastener elements for retaining the cover in the recess.

According to another embodiment of the invention, the plurality of touch fastener elements and the plurality of touch complementary fastener elements comprise hook and loop fastener elements.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
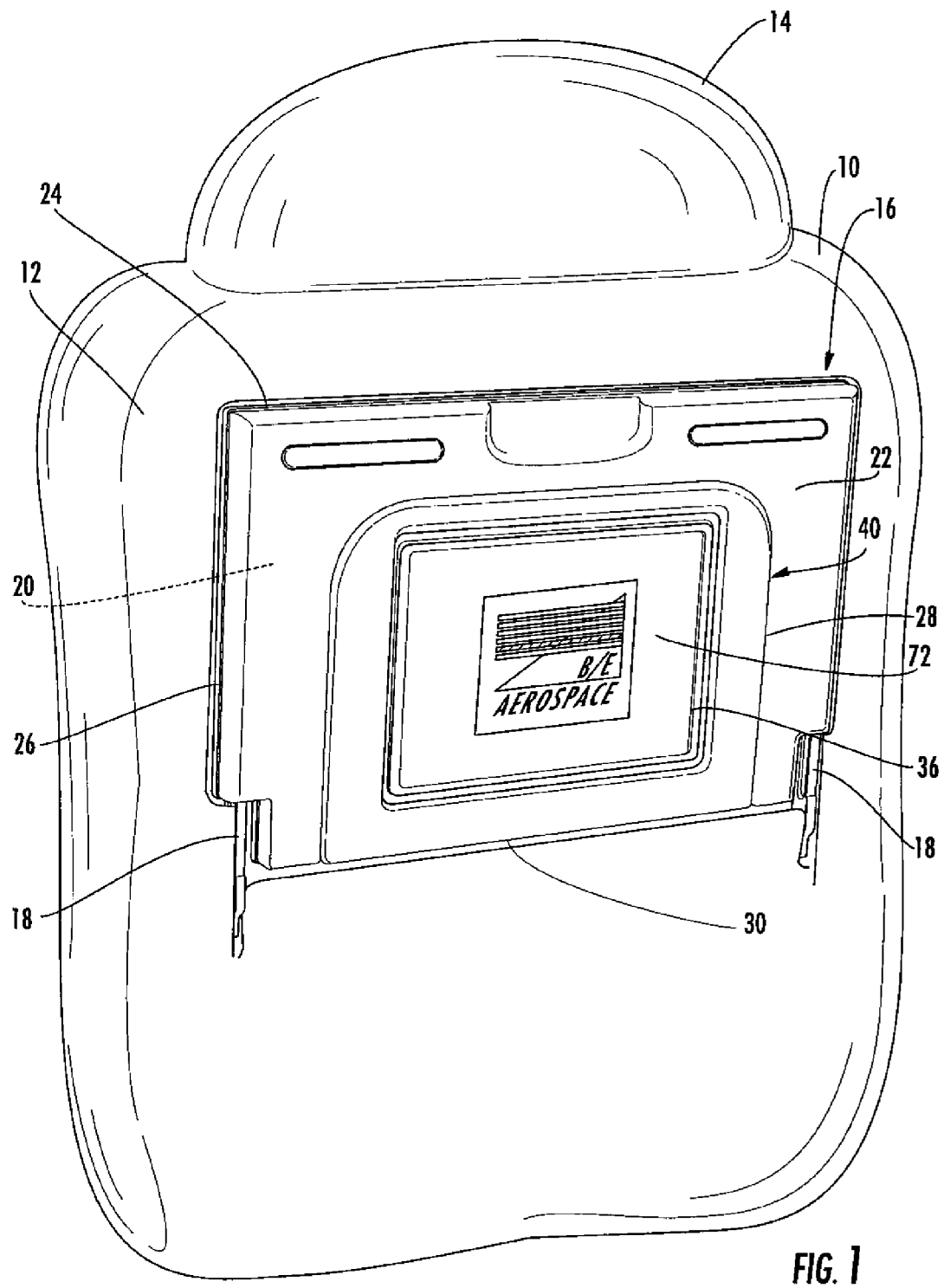
FIG. 1 is a perspective view of a seat back incorporating a meal tray constructed according to one embodiment of the present invention.

Referring to the drawings wherein identical reference numerals denote the same elements throughout the various views, an aircraft passenger seat back is illustrated in FIG. 1 and shown generally at reference numeral 10. It will be understood that the seat back 10 is part of a seat including a seat bottom and other conventional components not illustrated here. The present invention is equally applicable for use with other kinds of passenger seating, for example seating used in trains, buses or other vehicles. The seat back 10 includes a rear surface 12 and a headrest 14 positioned on an upper end thereof.

A meal tray 16 is carried on pivoting arms 18 or another suitable support structure, so that it can move in a conventional manner between a stowed position against the rear surface 12 of the seat back 10, and a deployed position in which it forms a generally horizontal surface for eating or other tasks.

Figure 2:
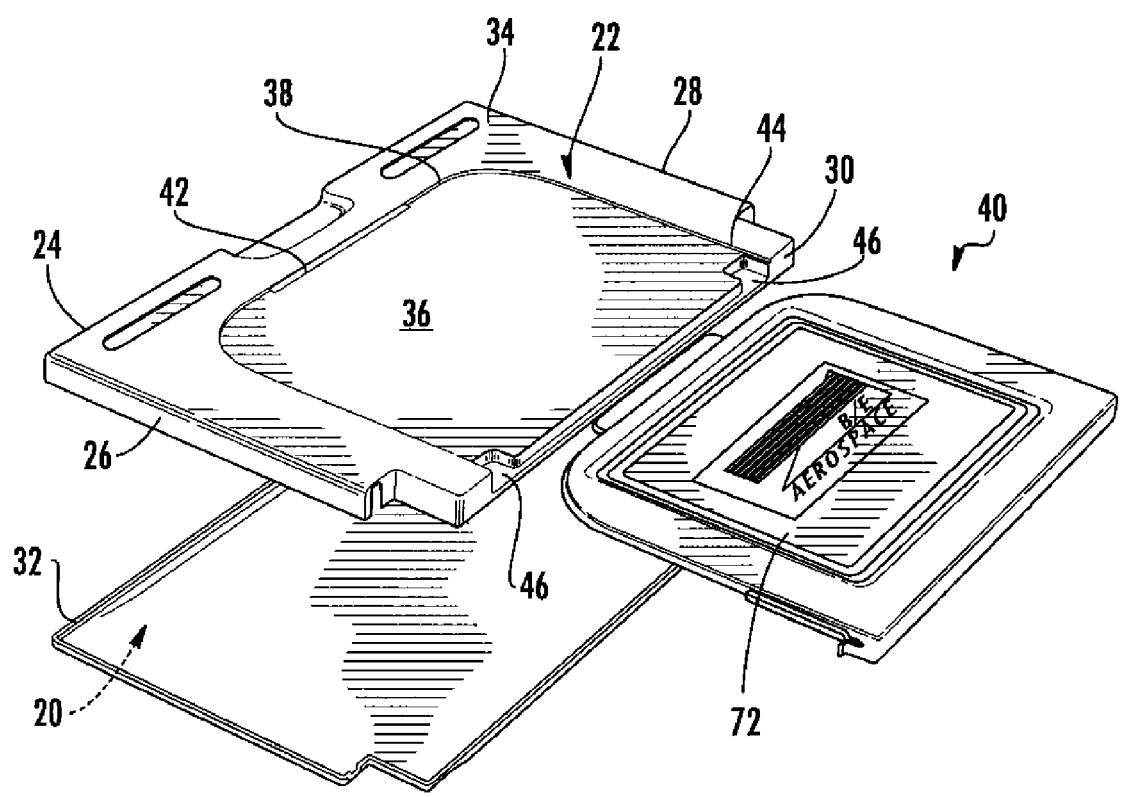
FIG. 2 is an exploded perspective view of the meal tray of FIG. 1.

The meal tray 16 has a forward surface 20 and an aft surface 22 which are designated in relation to its stowed position. It is bounded by a top edge 24, opposed side edges 26 and 28, and a bottom edge 30. As is best shown in FIG. 2, the meal tray 16 is constructed from a front shell 32 and a separate rear shell 34 which are connected together using suitable means such as adhesives, thermal bonding, snap-fits, or mechanical fasteners.

The aft surface 22 has a recess 36 formed therein, which has a lip 38 bounding three of its sides. A fourth side is open to receive an insert 40 (described below). In the example illustrated in FIG. 2, the fourth side is oriented towards the bottom of the meal tray 16, but it will be understood that the recess 36 could also be open to the sides or the top. A top groove 42 is disposed along the lip 38 near the top edge 24, and side grooves 44 are disposed along the lip near the side edges 26 and 28. A pair of locking receptacles 46 are formed at the lower corners of the recess 36.

Figure 3:
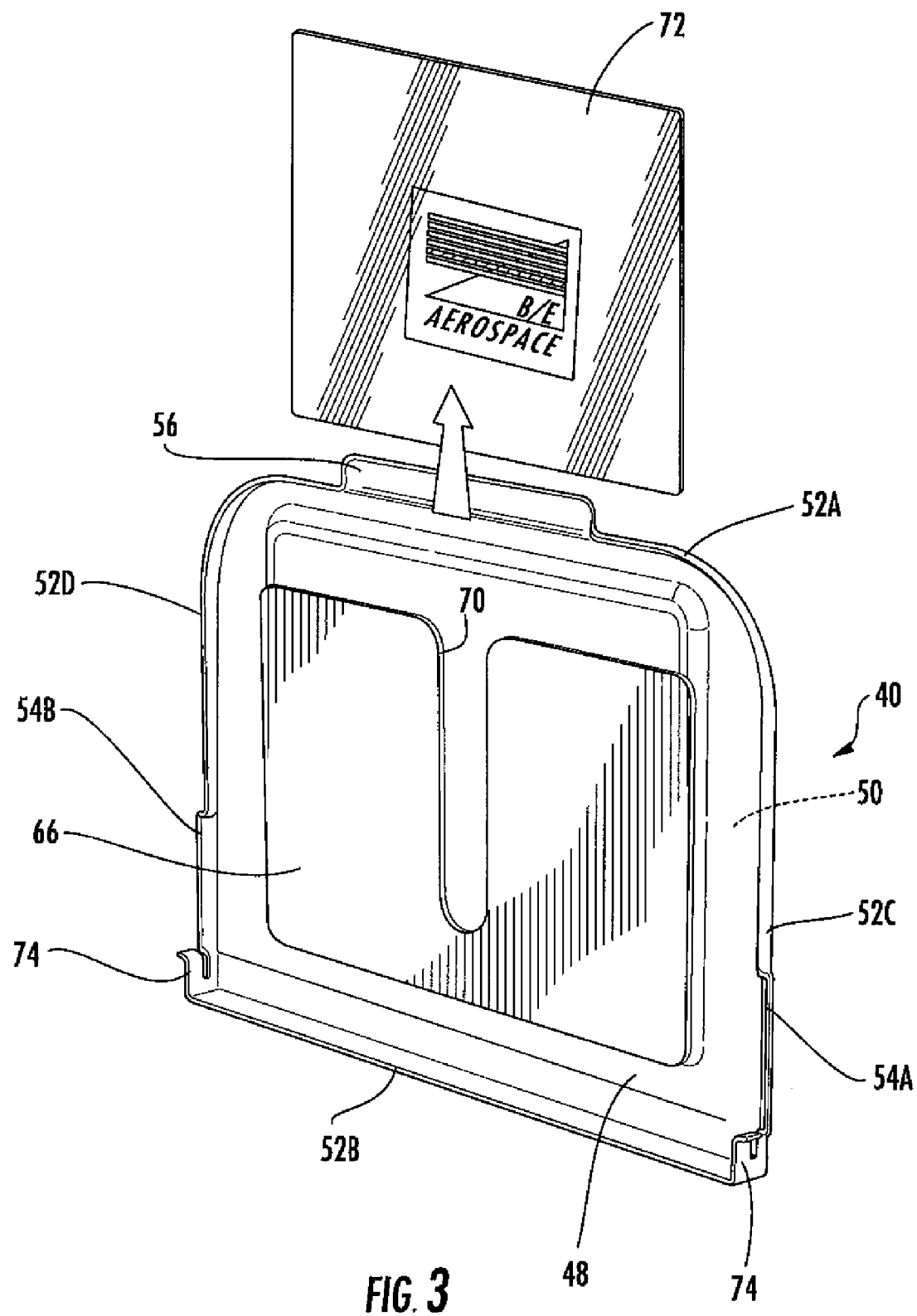
FIG. 3 is a perspective view of an insert which forms part of the meal tray.
Figure 4:
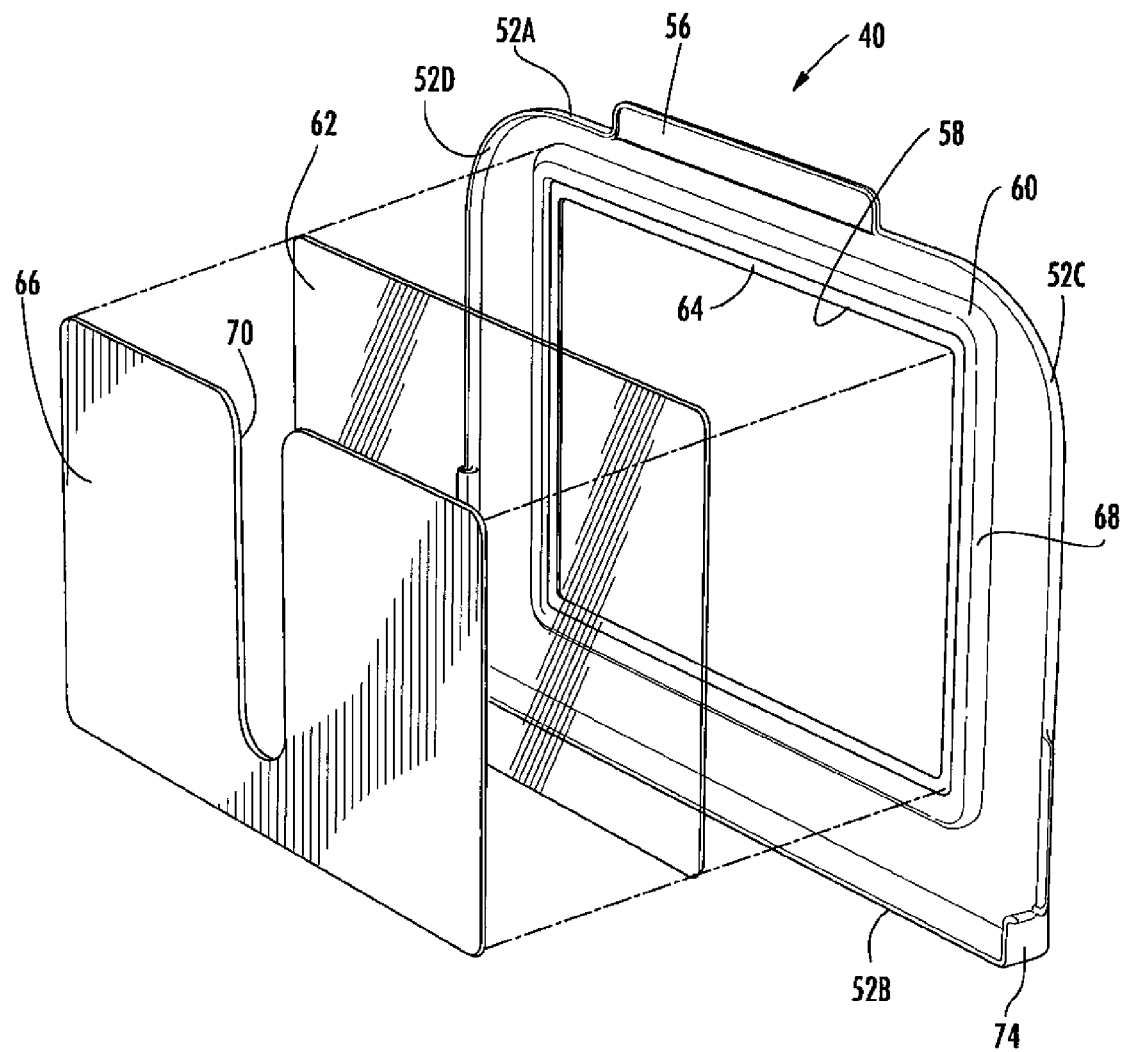
FIG. 4 is an exploded perspective view of the insert of FIG. 3.

FIGS. 3 and 4 illustrate the insert 40, which has opposed forward and aft faces 48 and 50, and top, bottom, left, and right edges designated 52A, 52B, 52C and 52D, respectively. Opposed side tabs 54A and 54B extend laterally from the left and right edges 52C and 52D, respectively, and a top tab 56 extends from the top edge 52A. A view opening 58 is formed through the insert 40, and a boss 60 surrounds the perimeter of the view opening 58. A transparent protective panel 62 is bonded to a shelf 64 formed in the boss 60, and a retaining panel 66 is bonded to the outer edge 68 of the boss 60. An access slot 70 may be provided in the retaining panel 66. As shown in FIG. 3, a sheet 72 containing an advertisement, graphics, or other information to be displayed can easily be inserted into or removed from the space between the retaining panel 66 and the protective panel 62.

The insert 40 includes at least one locking device to retain it in the recess 36. In the exemplary embodiment shown in FIGS. 5A, 5B and 6, latches 74 are disposed on opposite sides of the insert 40 near the bottom edge 52B. Each of the latches 74 has a resilient beam portion 76 and a laterally protruding finger 78.

Figure 7:
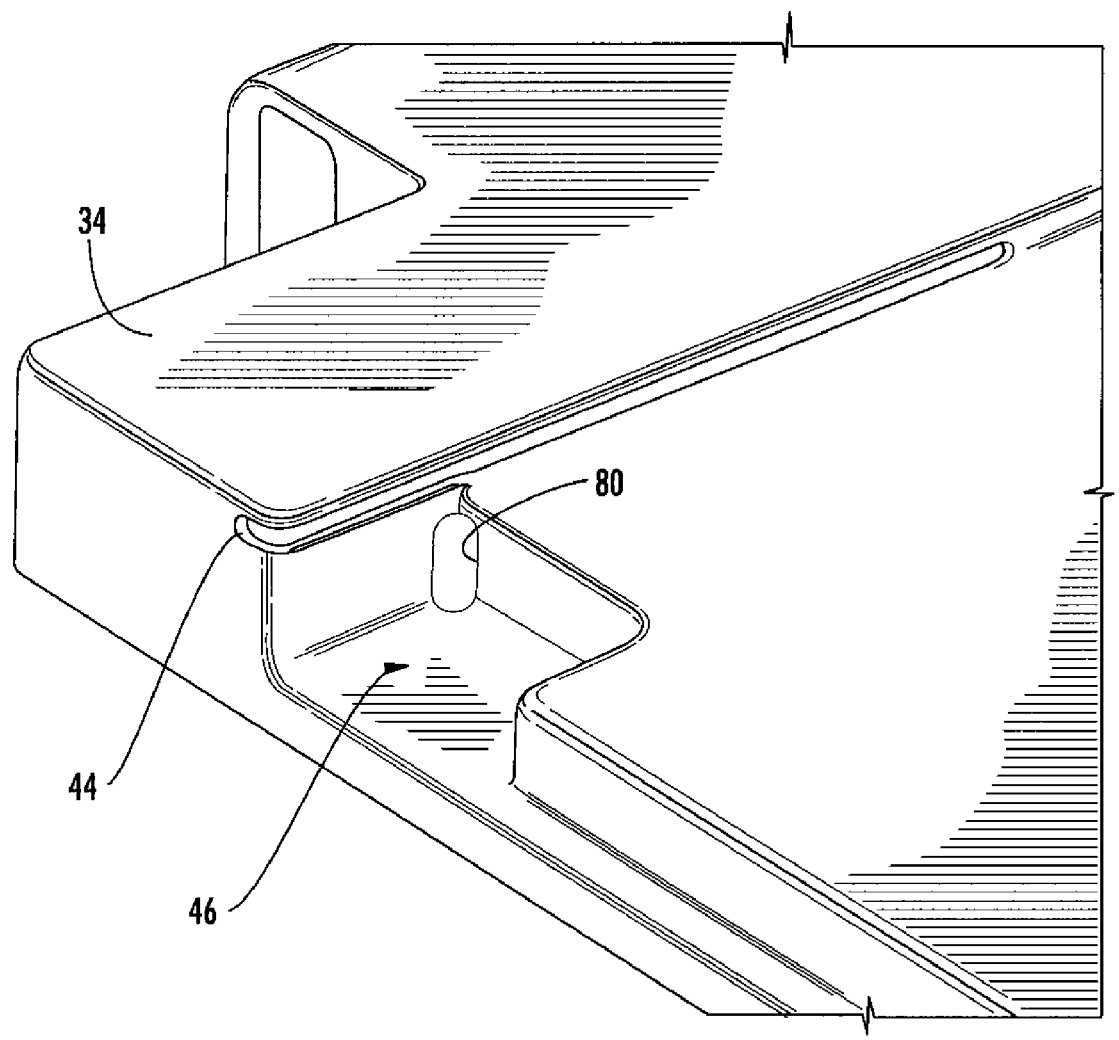
FIG. 7 is an enlarged perspective side view of a portion of the bottom shell.

The locking receptacles 46 include a locking element complementary to the fingers 78. For example, as shown in FIG. 7, an elongated opening 80 may be formed through a side wall of the locking receptacle 46.

Figure 5A:
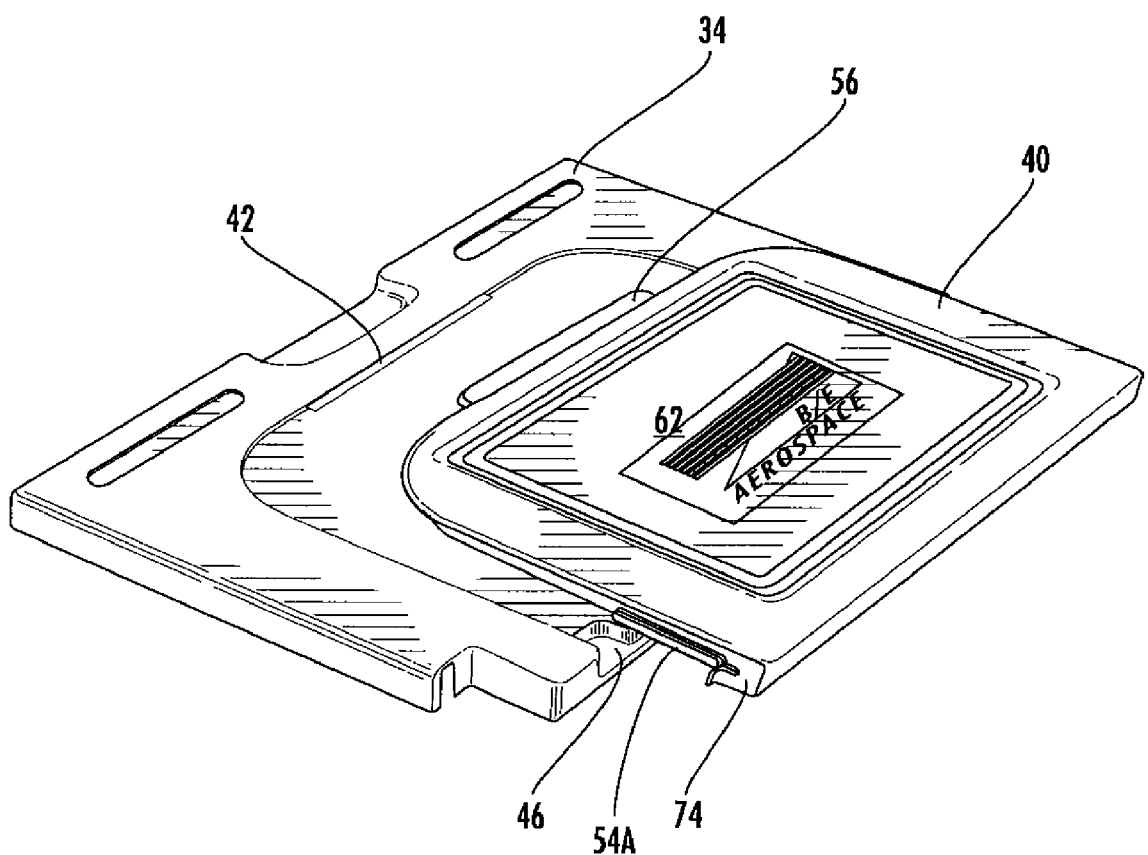
FIG. 5A is a perspective view showing an insert removed from a bottom shell of the meal tray.
Figure 5B:
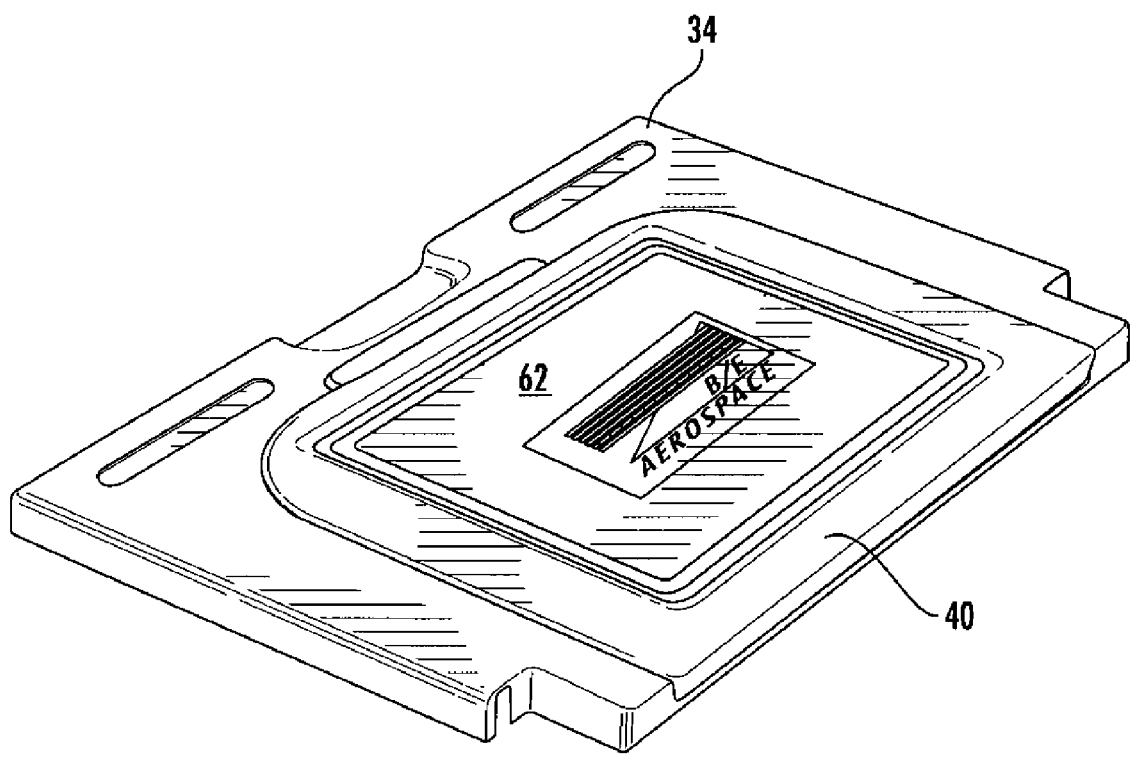
FIG. 5B is a perspective view of the bottom shell shown in FIG. 5, with the insert installed in the shell.
Figure 6:
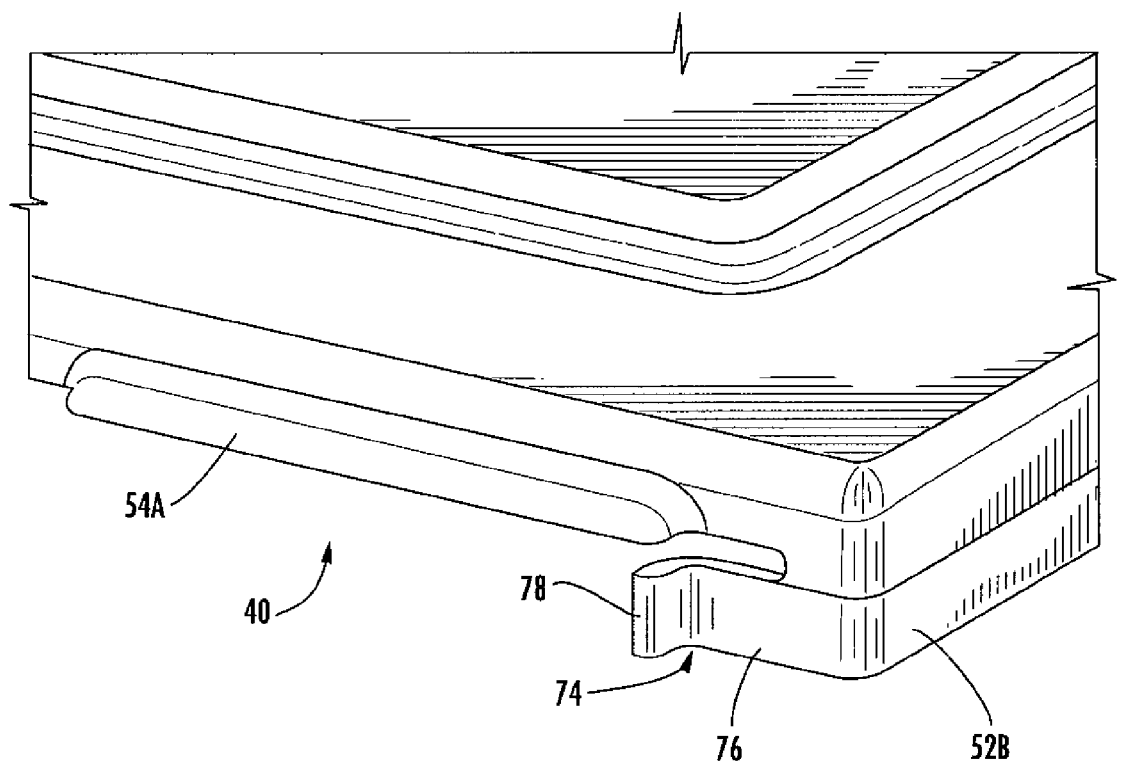
FIG. 6 is an enlarged perspective side view of a portion of the insert.

FIGS. 5A and 5B illustrate manner of inserting the graphical display into the meal tray 16. After a sheet 72 is placed in the insert 40 as described above, the insert 40 is slid upwards into the recess 36. The top tab 56 engages the top groove 42, and the side tabs 54 slide into the side grooves 44, thus preventing the insert 40 from moving in forward or aft directions. As the insert 40 is pushed fully into the recess 36, the latches 74 flex inwards and then spring outwards to force the fingers 78 thereof into the openings 80 in the locking receptacles 46. Once fully installed, the insert 40 cannot be easily withdrawn and the latches 74 are not exposed, as shown in FIG. 5B. This discourages unauthorized disassembly or vandalism. When is It desired to change the sheet 72, the latches 74 are pressed inwards with a screwdriver or other thin-bladed tool (not shown) to pull the fingers 78 clear of the openings 80. The insert 40 can then be slid out of the recess 36 and the sheet 72 replaced.

Figure 8:
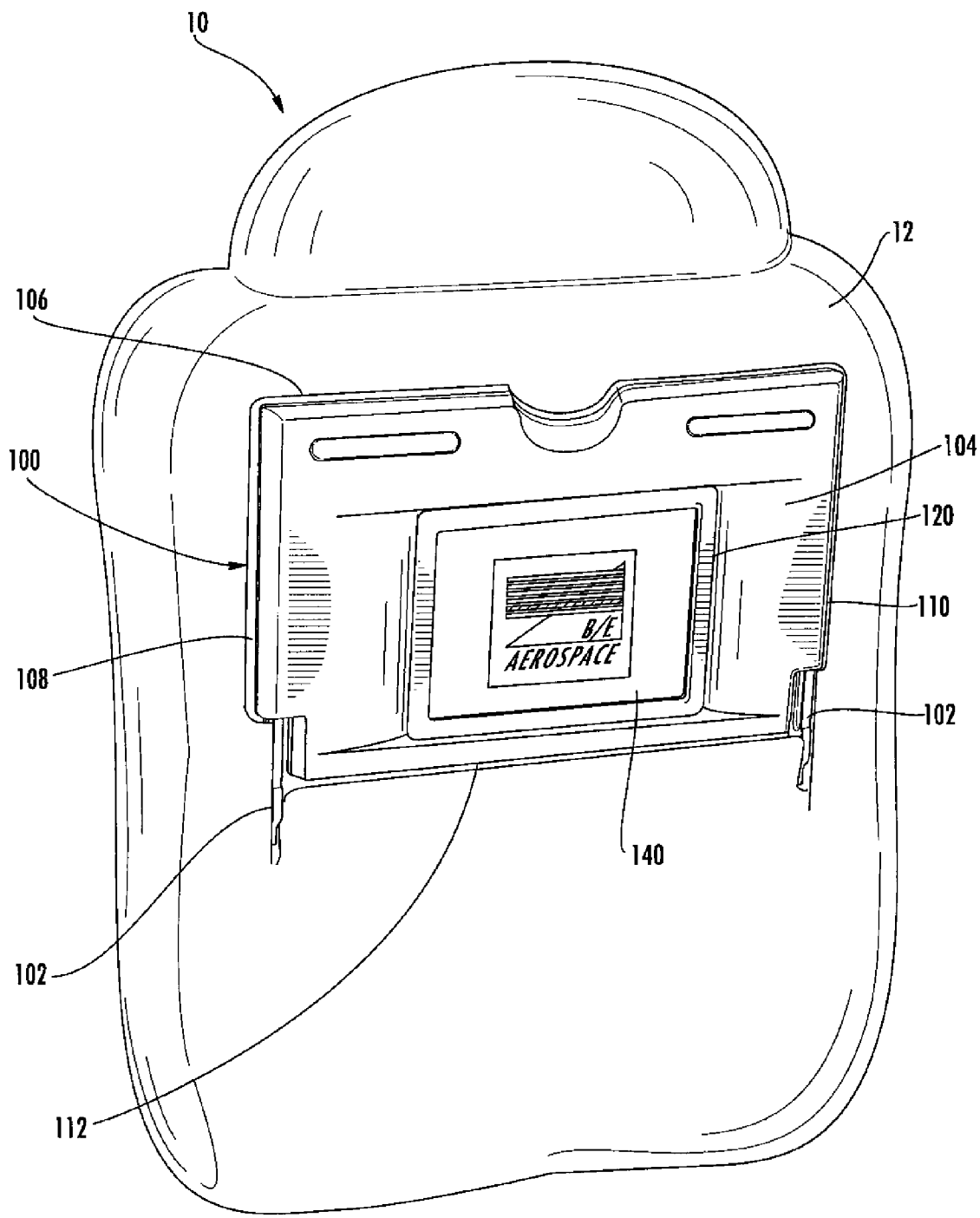
FIG. 8 is a perspective view of the rear-facing side of a seat back with another showing another embodiment of a meal tray with an advertising display.
Figure 9:
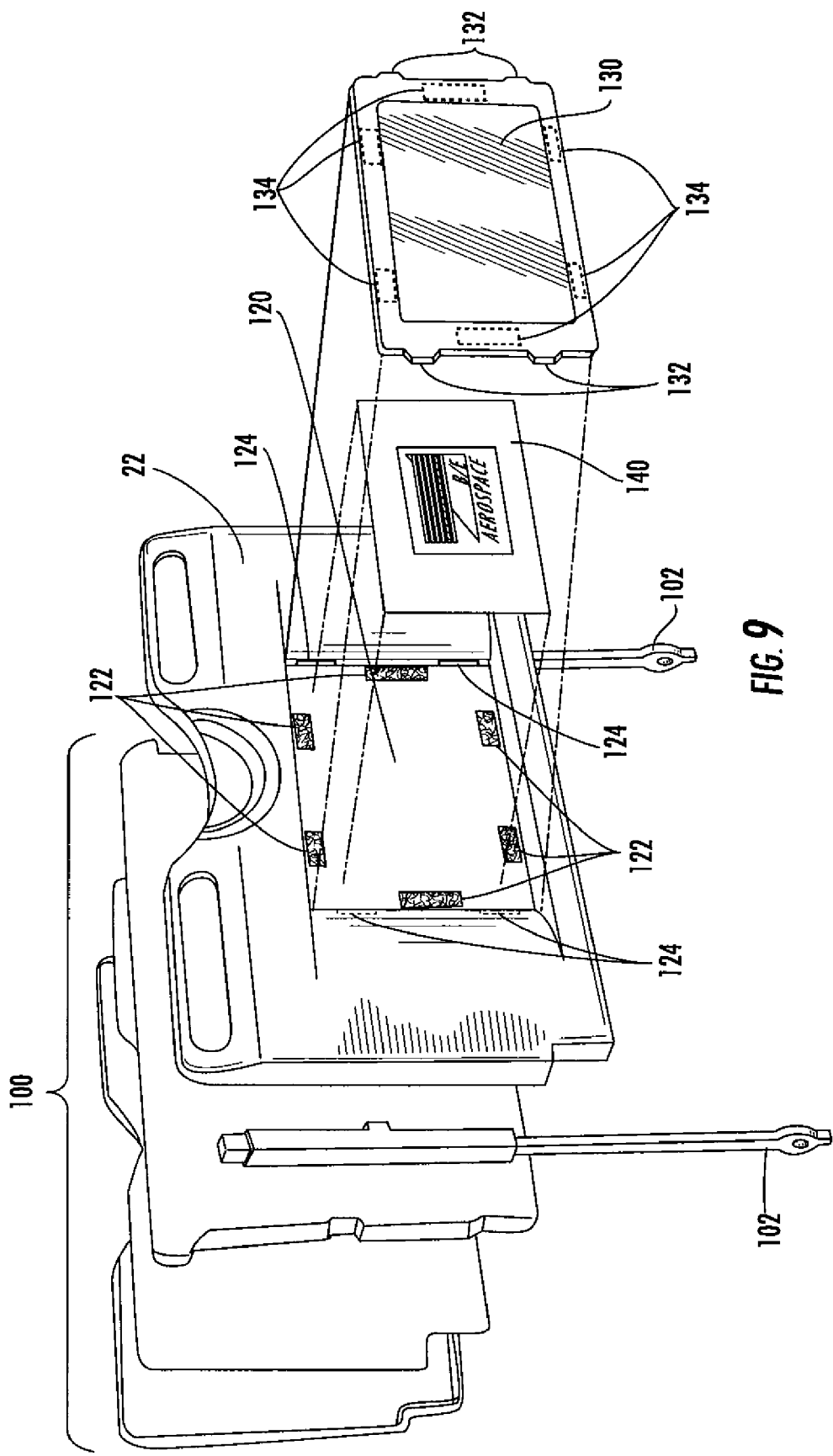
FIG. 9 is a partially disassembled view of the meal tray shown in FIG. 8.
Figure 10:
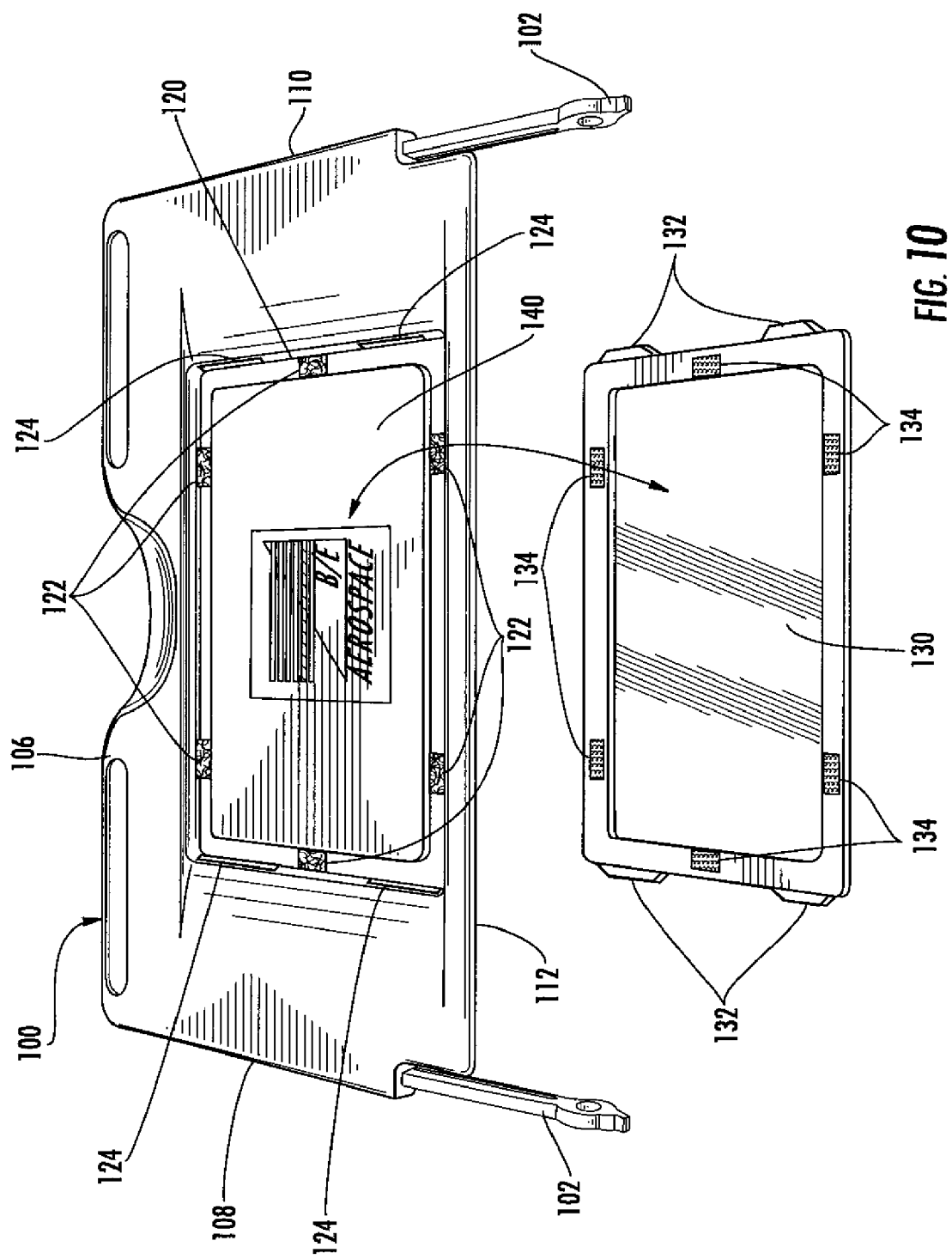
FIG. 10 illustrates removal of the front cover of the cover of the advertising display with a suction cup.

Referring now to FIGS. 8, 9 and 10, another embodiment of an advertising display for a meal tray is shown. The meal tray 100 is carried on pivoting arms 102 or another suitable support structure so that it can move in a conventional manner between a stowed position against the rear surface 12 of the seat back 10, and a deployed position in which it forms a generally horizontal surface for eating or other tasks.

The meal tray 100 has an aft surface 104 referred to in relation to its stowed position, and which forms the bottom surface of the tray 100 when deployed for use. It is bounded by a top edge 106, opposed side edges 108 and 110, and a bottom edge 112. The meal tray 100 has a recess 120 formed in the aft surface 104. Several spaced fastener elements, such as hook or loop elements 122, are positioned around the periphery of the recess 120. In the embodiment shown in FIGS. 9 and 10, tab slots 124 are formed in the recess 120. A transparent cover 130 fabricated from, for example, a flexible polycarbonate sheet, is sized to fit within the recess, and is provided with tabs 132 that are positioned to be received within the tab slots 124. The tabs 132 are positioned in the tab slots 124 by flexing the cover 130 slightly, and while flexed, positioning the tabs 132 into the tab slots 124. When released, the cover 130 returns to its unflexed state with the tabs 132 securely positioned within the tab slots 124.

The cover also includes fastener elements 134 on the forward-facing surface of the cover 130 that are complementary to the fastener elements 122 on the recess 120 in both position and type, so that for example, if the fastener elements 122 are loop-type fasteners, then the fastener elements 134 are mating hook-type elements. The fastener elements 122 and 134 further secure the cover 130 to the meal tray 100, prevent gaps between the cover 130 and the meal tray 100, and provide an attachment that is sufficiently robust to retard tampering or removal except when removal is desired.

As is shown in FIG. 9, a suitable card 140 having graphical material thereon is positioned in the recess 120 and sandwiched between aft surface 104 of the meal tray 100 and the cover 130.

Figure 11:
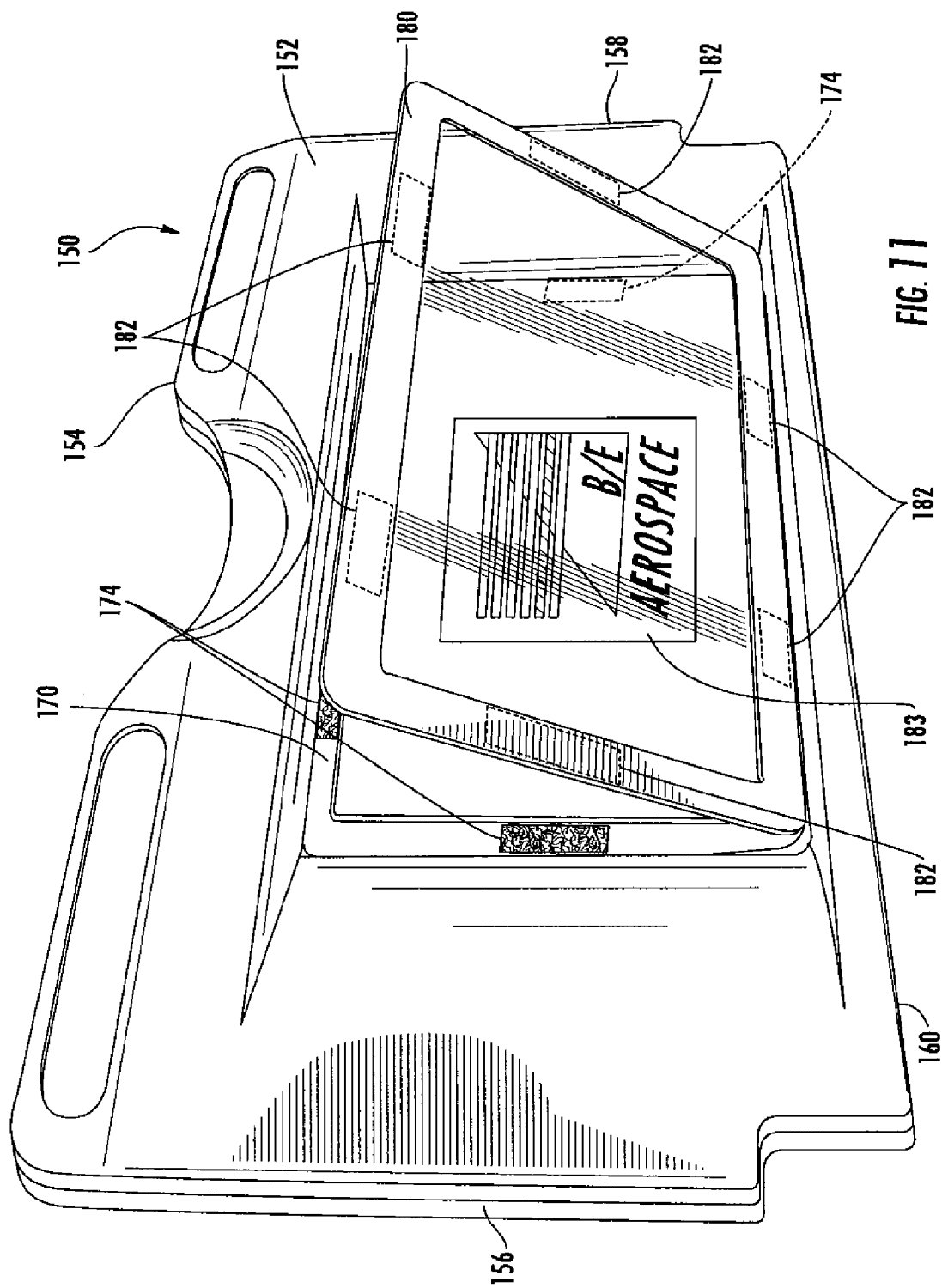
FIG. 11 illustrates an advertising display according to a further embodiment of the invention, in disassembled form.
Figure 12:
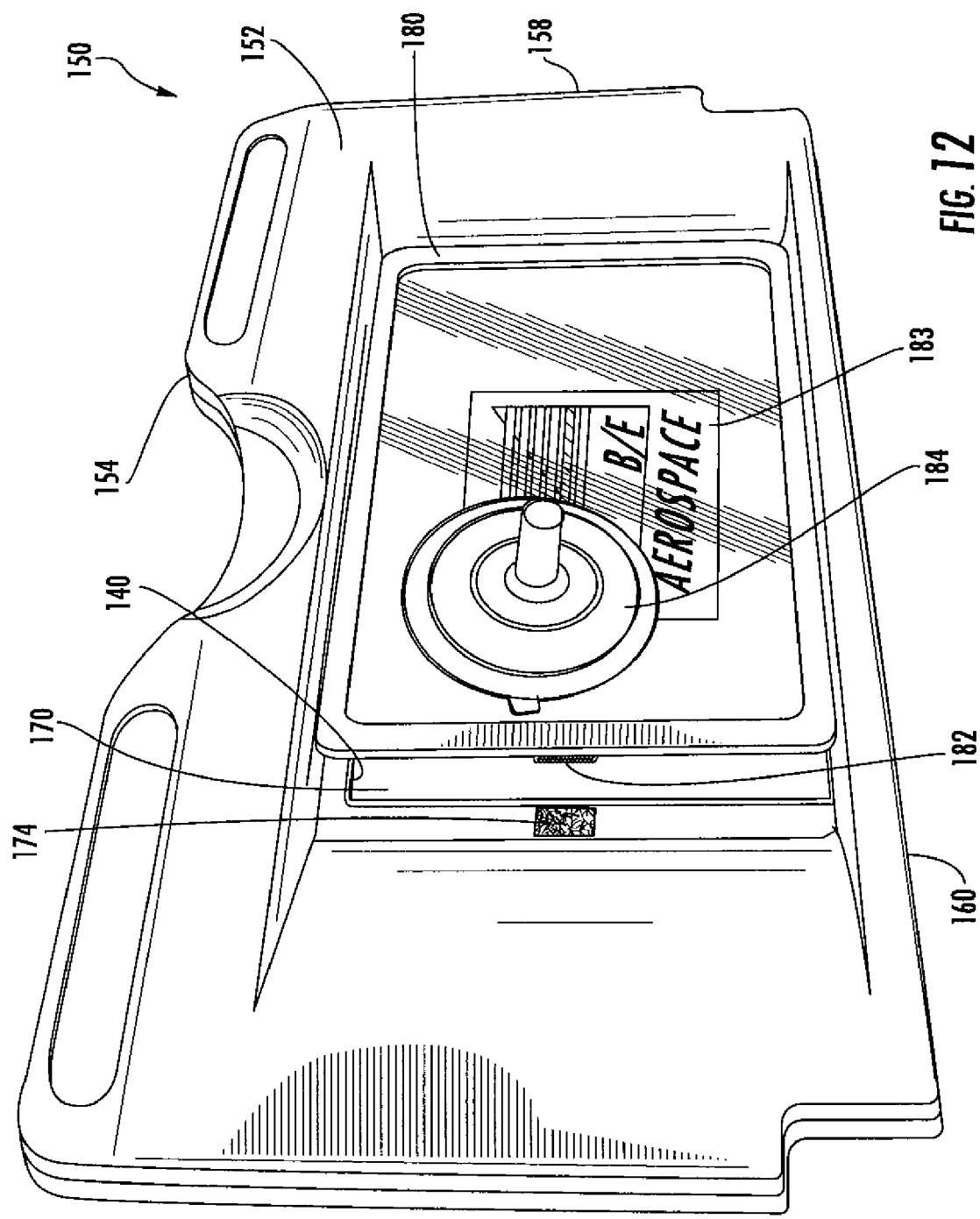
FIG. 12 is an exploded view of the seat back and advertising display shown in FIG. 11.

Referring now to FIGS. 11 and 12, meal tray 150 is shown, and is similar to the embodiment shown in FIGS. 8-10. The meal tray 150 has an aft surface 152 that forms the bottom surface of the tray 150 when deployed for use. The meal tray has a top edge 154, opposed side edges 156 and 158, and a bottom edge 160. The meal tray 150 has a recess 170 formed in the aft surface 152. Several spaced fastener elements, such as hook or loop elements 174, are positioned around the periphery of the recess 170 (not all shown). A transparent cover 180 fabricated from, for example, a flexible polycarbonate sheet, is sized to fit within the recess 170. The cover 180 includes fastener elements 182 on the forward-facing surface of the cover 180 that are complementary to the fastener elements 174 on the recess 170 in both position and type, so that for example, if the fastener elements 174 are loop-type fasteners, then the fastener elements 182 are mating hook-type elements. The fastener elements 174 and 182 secure the cover 180 to the meal tray 150, prevent gaps between the cover 180 and the meal tray 150, and provide an attachment that is sufficiently robust to retard tampering or removal except when removal is desired. As shown in FIGS. 11 and 12, a card 183 is positioned in the recess 170 and sandwiched between aft surface 152 of the meal tray 150 and the cover 180.

As is shown in FIG. 12, a suction cup 184 may be used to detach the cover 180 from the recess 170 without the need to extend a tool behind the cover 180 to pull the cover loose. This will prevent damage to the edges of the cover 180 and avoid the use of fingernails or other implements.

An advertising display for a seat back meal tray is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

What is claimed is:

1. A meal tray assembly for being carried by an aft-facing side of a seat back for use by a person seated aft of the seat back, and comprising:
   (a) a tray mountable to the seat back and movable between a stowed position generally flush with the seat back and a deployed position generally perpendicular to the seat back, the tray including a first surface facing forward when in the stowed position and a second surface facing rearward towards the aft-seated person when in the stowed position;
   (b) the second surface including a recess therein; and
   (c) an insert configured to be received within the recess, the insert comprising a transparent protective panel and a retaining panel defining a space therebetween for receiving a graphical display sheet for viewing by the person seated aft of the seat back when the tray is in the stowed position;
   wherein the recess includes at least one fastener element positioned therein and the insert includes at least one complementary fastener element for engaging the at least one fastener element and retaining the insert within the recess, and
   wherein the transparent protective panel and the retaining panel are each bonded to the insert.

2. A meal tray assembly according to claim 1, wherein an aft face of the insert is generally flush with the second surface surrounding the recess when the insert is received within the recess.

3. A meal tray assembly according to claim 1, wherein the recess communicates with an edge of the tray, and the insert is sized to be received within the recess from the edge of the tray.

4. A meal tray assembly according to claim 1, wherein the at least one fastener element of the recess includes a plurality of spaced-apart fastener elements positioned therein, and the at least one complimentary fastener element of the insert includes a plurality of spaced-apart complementary fastener elements for engaging the plurality of spaced-apart fastener elements for retaining the insert within the recess.

5. A meal tray assembly according to claim 4, wherein the insert includes a frame, and the complementary fastener elements are positioned on the frame.

6. A meal tray assembly for being carried by an aft-facing side of a seat back for use by a person seated aft of the seat back, and comprising:
   (a) a tray mountable to the seat back and movable between a stowed position generally flush with the seat back and a deployed position generally perpendicular to the seat back, the tray including a first surface facing forward when in the stowed position and a second surface facing rearward towards the aft-seated person when in the stowed position;
   (b) the second surface including a recess therein; and
   (c) an insert configured to be received within the recess, the insert comprising a transparent protective panel and a retaining panel defining a space therebetween for receiving a graphical display sheet for viewing by the person seated aft of the seat back when the tray is in the stowed position;
   wherein the insert comprises a frame having a viewing opening formed therethrough and wherein the recess includes a pair of opposed locking receptacles adapted to receive and retain a pair of complementary latches on the frame for locking the frame into the recess, and
   wherein the transparent protective panel and the retaining panel are each bonded to the insert.

7. A meal tray assembly for being carried by an aft-facing side of a seat back for use by a person seated aft of the seat back, and comprising:
   (a) a tray mountable to the seat back and movable between a stowed position generally flush with the seat back and a deployed position generally perpendicular to the seat back, the tray including a first surface facing forward when in the stowed position and a second surface facing rearward towards the aft-seated person when in the stowed position;
   (b) the second surface including a recess therein; and
   (c) an insert configured to be received within the recess, the insert comprising a transparent protective panel and a retaining panel defining a space therebetween for receiving a graphical display sheet for viewing by the person seated aft of the seat back when the tray is in the stowed position;

wherein the retaining panel includes an elongate slot suitable for removing the graphical display sheet from between the transparent protective panel and the retaining panel, and wherein the transparent protective panel and the retaining panel are each bonded to the insert.

8. A meal tray assembly for being carried by an aft-facing side of a seat back for use by a person seated aft of the seat back, and comprising:
  (a) a tray mountable to the seat back so that it is movable between a stowed position generally flush with the seat back and a deployed position generally perpendicular to the seat back, the tray including a first surface facing forward when in the stowed position and a second surface facing rearward when in the stowed position;
  (b) the second surface including a recess therein, the recess having at least one locking receptacle formed therein; and
  (c) an insert for being positioned in the recess, the insert having a viewing window formed therethrough defining a perimeter and a boss surrounding the perimeter of the viewing window, the insert further comprising a transparent first panel and a second panel each affixed to the boss, the second panel defining a space between the transparent first panel and the second panel for receiving a graphical display sheet, the insert including a frame having at least one latch for engaging the at least one locking receptacle to retain the insert within the recess, wherein the transparent first panel and the second panel are each bonded to the insert.

9. A meal tray assembly according to claim 8, wherein the at least one latch has a beam portion and a laterally protruding finger.

10. A meal tray assembly according to claim 9, wherein the at least one locking receptacle includes a locking element complimentary to the finger of the at least one latch.

11. A meal tray assembly according to claim 8, wherein the second panel includes an elongate slot suitable for removing the graphical display sheet from between the transparent first panel and the second panel.

12. A meal tray assembly according to claim 8, wherein an aft face of the insert is generally flush with the second surface surrounding the recess when the insert is received within the recess.

* * * * *